United States Patent [19]
Ozaki

[11] Patent Number: 4,980,755
[45] Date of Patent: Dec. 25, 1990

[54] CIRCUIT FOR ENHANCING A COLOR DIFFERENCE SIGNAL BY UTILIZING THE CHANGE OF A LUMINANCE SIGNAL

[75] Inventor: Hidetoshi Ozaki, Tokyo, Japan

[73] Assignee: Victor Company of Japan, Ltd., Japan

[21] Appl. No.: 467,434

[22] Filed: Jan. 19, 1990

Related U.S. Application Data

[62] Division of Ser. No. 228,840, Aug. 3, 1988, Pat. No. 4,912,551.

[30] Foreign Application Priority Data

Aug. 4, 1987 [JP] Japan .................. 62-195073

[51] Int. Cl.⁵ .................................. H04N 5/14
[52] U.S. Cl. .................................. 358/37
[58] Field of Search ............... 358/37, 166, 162, 40

[56] References Cited

U.S. PATENT DOCUMENTS

| | | | |
|---|---|---|---|
| 4,030,121 | 6/1977 | Faroudja | 358/37 |
| 4,504,853 | 3/1985 | Faroudja . | |
| 4,541,014 | 9/1985 | Yagi | 358/37 |
| 4,581,631 | 4/1986 | Sonnenberger . | |
| 4,729,014 | 3/1988 | Flamm et al. | 358/37 |

FOREIGN PATENT DOCUMENTS

| | | | |
|---|---|---|---|
| 3541103 | 12/1986 | Fed. Rep. of Germany . | |
| 0140825 | 11/1979 | Japan | 358/37 |
| 2106746 | 4/1983 | United Kingdom . | |
| 3223580 | 12/1983 | United Kingdom . | |

OTHER PUBLICATIONS

"Picture Signal Improvement in Color TV Receivers" by Hartmut Harolos IEEE Transactions on Consumer Electronics, vol. CE-31, No. 3, Aug. 1985.

Primary Examiner—Howard W. Britton
Assistant Examiner—David E. Harvey
Attorney, Agent, or Firm—Lowe, Price, Leblanc, Becker & Shur

[57] ABSTRACT

An enhancing circuit wherein a color difference signal (b) is enhanced by utilizing the change of a luminance signal (a). The luminance signal (a) is sent, via a low-pass filter (2), a first delay circuit (3), a first differentiation circuit (4), a detector (5), a slicer (6), and a second differentiation circuit (7), to a comparator set (8) to produce two signals (i and j). The two signals (i and j) are sent to first and second sample-and-hold circuits (11 and 12). Meanwhile, the color difference signal (b) is delayed in a second delay circuit (10). In these two sample-and-hold circuit (11 and 12), such a delayed color difference signal (c) and color different signal (b) are respectively held in response to the two signals (i and j). Then, such two held signals (I' and II') and the delayed color difference signal (d) are sent to a switching circuit (13) for selecting one of these three signals (I', II', III') in accordance with the combination of the two signals (i and j) thereby producing an enhanced color difference signal (k). Since the luminance signal (a) has a wide frequency band, color-ringing of an image can be satisfactorily reduced.

2 Claims, 7 Drawing Sheets

THRESHOLD LEVEL

CIRCUIT FOR ENHANCING A COLOR DIFFERENCE SIGNAL BY UTILIZING THE CHANGE OF A LUMINANCE SIGNAL

This is a division, of U.S. patent application Ser. No. 07/228,840 now U.S. Pat. No. 4,912,551.

BACKGROUND OF THE INVENTION

1. Field of the Invention

This invention relates generally to an enhancing circuit which is used for the image processings of TVs, VTRs, or the like, and particularly to a circuit arrangement for enhancing a color difference signal of a video signal by utilizing the change of a luminance signal of the video signal.

2. Prior Art

As is well known in the art, there are circuits for enhancing a luminance signal. If these circuits are applied to a circuit for enhancing a color diffence signal, the ringing of colors occurrs in every color-changing portions of images. In the signal processing method of home VTRs, a color difference signal is converted into a low-band signal by an AM recording method in order to reduce the undesirable effect of jitter. Since the frequency-converted color difference signals are of low frequency, i.e. several hundreds of kilohertz (for example, 629 Hz for VHS format and 688 kHz for Betamax format), the degree of azimuth loss is negligibly low thereby causing crosstalk between adjacent tracks on a recording medium. In addition, the AM recording method has disadvantages such as an unsatisfactory SN ratio and a narrow frequency band. Although the SN ratio has been improved by a noise reduction circuit using a field memory in recent years, there is a problem of color-ringing originated from the narrow frequency band. Besides, although there is a home VTR whose frequency band of a luminance signal is wider, since the same color difference signal processing method as previous VTRs is used in the home VTR, the color-ringing problem still remains as a large drawback.

Hence, the enhancement of the color difference signal is considered. One example of the conventional enhancing circuit is disclosed in "Picture Signal Improvement in Color TV Receivers", IEEE, CE31, No. 3, August 1985. In this enhancing circuit, however, since only information in the color difference signal is used for the enhancement, satisfactory enhanced color difference signal is hardly produced because the frequency band is narrow, i.e. information is not enough. Accordingly, the deterioration of SN ratio cannot be satisfactorily improved.

SUMMARY OF THE INVENTION

The present invention has been developed in order to remove the above-described drawbacks inherent to the conventional circuit for enhancing a color difference signal.

It is, therefore, an object of the present invention to provide a new and useful circuit for enhancing a color difference signal by using the change of a luminance signal.

It is another object of the invention to provide an enhancing circuit suffering no deterioration of SN ratio at flat portions of a color difference signal.

It is a further object of the invention to provide an enhancing circuit in which the color-ringing of an image can be satisfactorily reduced.

It is a still further object of the invention to provide an enhancing circuit which is easily applicable to a digital circuit.

In accordance with the present invention there is provided a circuit arrangement for enhancing a color difference signal of a video signal, comprising: filter means responsive to a luminance signal of the video signal for limiting the bandwidth of the luminance signal; first delay circuit means for delaying an output signal from the filter means; first differentiation circuit means for differentiating an output signal from the first delay circuit means; detector means for detecting an output signal from the first differentiation circuit means; slicer means responsive to an output signal from the detector means for slicing the output signal from the detector means at a predetermined slice level thereof; second differentiation circuit means for differentiating an output signal from the slicer means; comparator set means responsive to an output signal from said second differentiation circuit means for producing first and second signals by comparing said output signal from said second differentiation circuit means with two predetermined signal levels; second delay circuit means for delaying the color difference signal; first sample-and-hold circuit means for holding the output signal from the second delay circuit means in response to the first signal thereby outputting a third signal indicative of a held level of the output signal from the second delay circuit means; second sample-and-hold circuit means for holding the color difference signal in response to the second signal thereby outputting a fourth signal indicative of a held level of the color difference signal; and switching circuit means responsive to the third signal, the output signal from the second delay circuit means, and the fourth signal for selecting one of these three signals in accordance with combination of the first and second signals thereby outputting a signal which is selected therein.

In accordance with the present invention there is also provided a circuit arrangement for enhancing a color difference signal of a video signal, comprising: filter means responsive to a luminance signal of the video signal for limiting the bandwidth of the luminance signal; differentiation circuit means for differentiating an output signal from the filter means; detector means for detecting an output signal from the differentiation circuit means; comparator means responsive to an output signal from the detector means for comparing the output signal from the detector means with a predetermined threshold level thereby outputting a first signal; delay circuit means for delaying the color difference signal; quadratic differentiation circuit means responsive to an output signal from the delay circuit means for differentiating the output signal from the delay circuit means two times; switching circuit means responsive to the first signal and an output signal from the quadratic differentiation circuit means for outputting the output signal from the quadratic differentiation cirucit in response to the first signal; and subtractor means for subtracting an output signal of the switching circuit means from the output signal of the delay circuit means thereby producing a signal indicative of an enhanced color difference signal.

In accordance with the present invention there is further provided a circuit arrangement for enhancing a color difference signal of a video signal, comprising: filter means responsive to a luminance signal of the video signal for limiting the bandwidth of the luminance signal; differentiation circuit means for differentiating an output signal from the filter means; detector means for detecting an output signal from the differentiation circuit means; comparator means responsive to an output signal from the detector means for comparing the output signal from the detector means with a predetermined threshold level thereby outputting a first signal; delay circuit means for delaying the color difference signal; quadratic differentiation circuit means responsive to an output signal from the delay circuit means for differentiating the output signal from the delay circuit means two times; switching circuit means responsive to the first signal and an output signal from the quadratic differentiation circuit means for outputting the output signal from the quadratic differentiation ciructi in response to the first signal; amplifier means for amplifying an output signal from the switching circuit; and subtractor means for subtracting an output signal of the amplifier means from the output signal of the delay circuit means thereby producing a signal indicative of an enhanced color difference signal.

In accordance with the present invention there is still further provided a digital circuit arrangement for enhancing color difference signal data derived from video signal data, comprising: low-pass filter means responsive to luminance signal data of the video signal data for limiting the bandwidth of the luminance signal data; first difference circuit means responsive to output signal data from the low-pass filter means for differentiating the output signal data from the low-pass filter means; ROM circuit means responsive to the output data from the first difference circuit means for looking up a ROM table in the ROM circuit means thereby outputting data in response to the output data from the first difference circuit means; second difference circuit means responsive to output signal data from the ROM circuit means for differentiating the output signal data from the ROM circuit means; first magnitude comparator means for comparing output signal data from the second difference circuit means with two predetermined threshold level data thereby outputting a first signal; second magnitude comparator means for comparing the output signal data from the second difference circuit means with two predetermined threshold level data thereby outputting a second signal; delay circuit means for delaying the color difference signal data; first latch means for latching the output signal data from the delay circuit means in response to the first signal thereby outputting first signal data indicative of latched level of the output signal from the delay circuit means; second latch means for latching the color difference signal data in response to the second signal thereby outputting second signal data indicative of latched level of the color difference signal data; and data selector means responsive to the first signal data, the output signal data from the delay circuit means, and the second signal data for selecting one of these three signal data in accordance with combination of the first and second signals thereby outputting signal data which is selected therein.

In accordance with the present invention there is still further provided a digital circuit arrangement for enhancing color difference signal data derived from video signal data, comprising: low-pass filter means responsive to luminance signal data of the video signal data for limiting the bandwidth of the luminance signal data; first difference circuit means responsive to output signal data from the low-pass filter means for differentiating the output signal data from the low-pass filter means; ROM circuit means responsive to the output data from the first difference circuit means for looking up a ROM table in the ROM circuit means thereby outputting a signal indicative of a switching signal in response to the output data from the first difference circuit means; delay circuit means for delaying the color difference signal data; latch means responsive to output signal data from the delay circuit means for latching the output signal data from the delay circuit means; second difference circuit means responsive to the output signal data from the delay circuit means for differentiating the output signal data from the delay circuit means two times thereby outputting first signal data indicative of difference signal data; and switching circuit means for outputting the difference signal data from the second difference circuit means in response to the switching signal outputted from the ROM circuit means; and adder means for substantially subtracting output signal data of the switching circuit means from output signal data of the latch means thereby outputting signal data indicative of enhanced color difference signal data.

BRIEF DESCRIPTION OF THE DRAWINGS

The object and features of the present invention will become more readily apparent from the following detailed description of the preferred embodiments taken in conjunction with the accompanying drawings in which.

The same or corresponding elements and parts are designated at like reference numerals throughout the drawings.

DETAILED DESCRIPTION OF THE INVENTION

Figure 1:
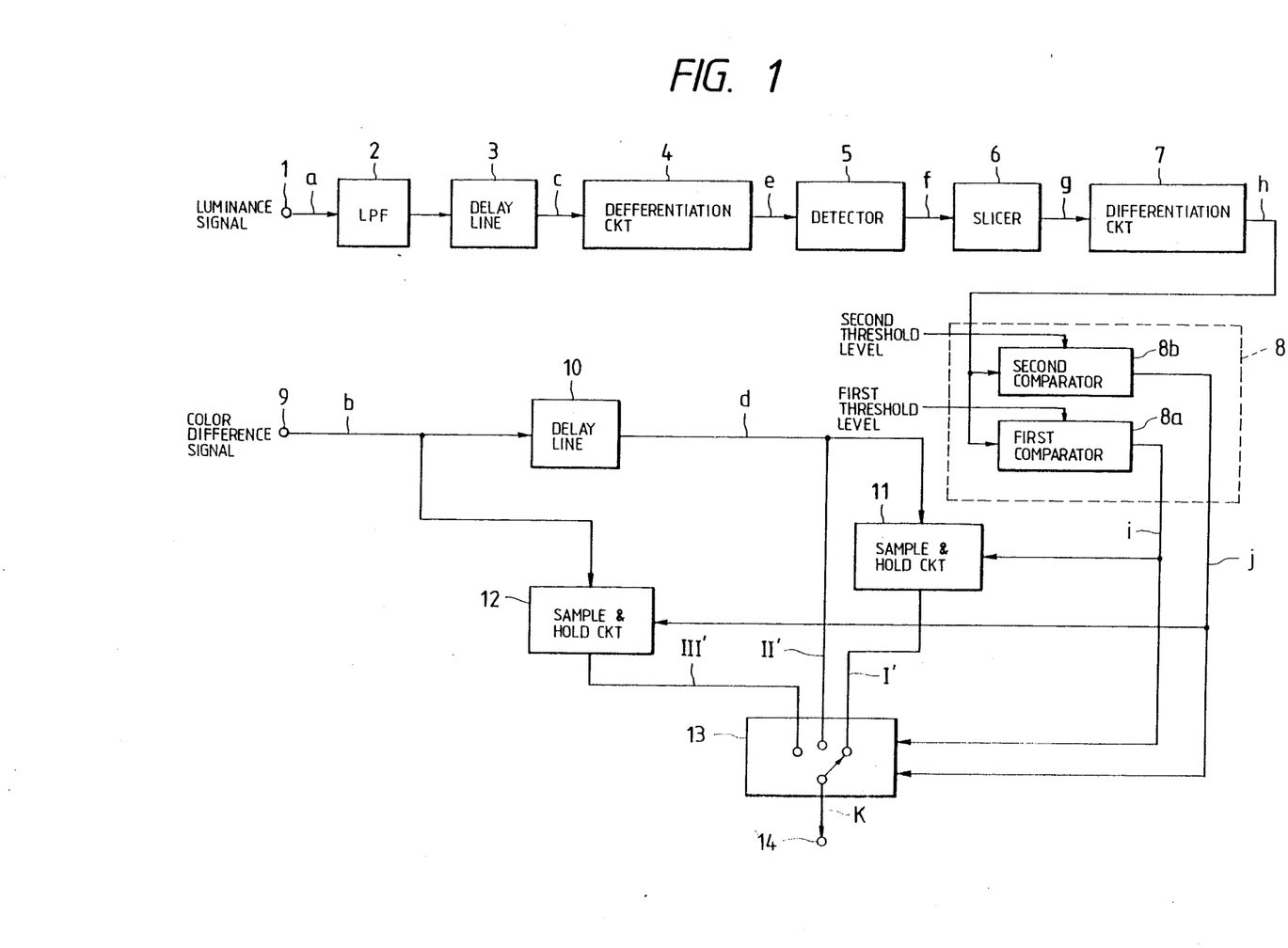
FIG. 1 is a block diagram showing an enhancing circuit of a first embodiment according to the present invention.

FIG. 1 shows a block diagram of an enhancing circuit for the enhancement of a color difference signal according to a first embodiment of the present invention. In FIG. 1, the enhancing circuit generally comprises a low-pass filter 2, a first delay line 3, a first differentiation circuit 4, a detecting circuit 5, a slicer 6, a second differentiation circuit 7, a comparator set 8 including first and second comparators 8a and 8b, a second delay line 10, first and second sample-and-hold circuits 11 and 12, and a switching circuit 13. In this structure, the change of a luminance signal (a) is utilized for enhancing a color difference signal (b). Assuming that the signal level of the luminance signal (a) is Y, this luminance signal can be obtained by the following formula:

$$Y = 0.3R + 0.59G + 0.11B$$

where R, G, and B are the signal levels of three primary colors.

The color difference signal (b) is presented by R-Y, and B-Y. It is to be noted that when the information of R-Y and B-Y changes, the luminance signal (a) also changes generally. In other words, there is few cases that only the information of R-Y and B-Y changes without the change of the luminance signal (a). Accordingly, the use of the information of the change of luminance signal (a) causes an effective enhancement of color difference signal (b).

Figure 2A:
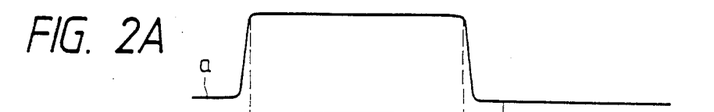
FIGS. 2A-2K show waveforms used for better understanding of the first embodiment.
Figure 2B:
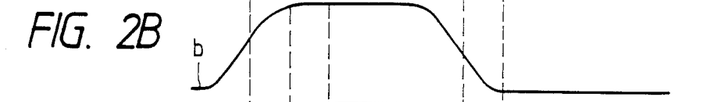
Figure 2C:
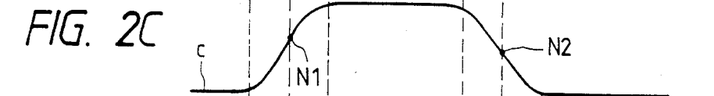
Figure 2D:
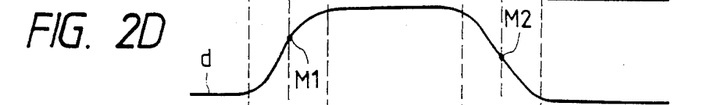
Figure 2E:
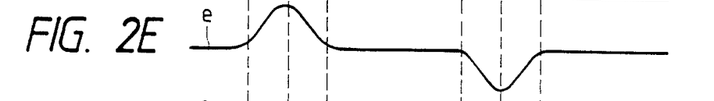
Figure 2F:
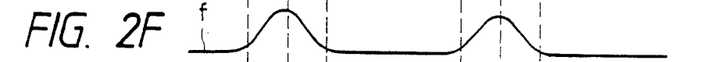

Now, the operation of the enhancing circuit according to the invention will be described with reference to FIGS. 1 and 2A–2K. The luminance signal (a) shown in FIG. 2A is inputted into a terminal 1, and is sent to the low-pass filter 2. In this low-pass filter 2, the bandwidth of the luminance signal (a) is limited within several times of the bandwidth of the color difference signal (b) shown in FIG. 2B because the luminance signal (a) has so large bandwidth in comparison with the color difference signal (b), and this band-limited signal is outputted to the first delay line 3. In the first delay line 3, the band-limited signal is delayed by a delay time which will be described later, and then a delayed signal (c) is produced (see FIG. 2C). The delayed signal (c) is differentiated in the first differentiation circuit 4, and a differentiated signal (e) is outputted to the detector 5. Here, the changing portions of the band-limited and delayed luminance signal (c) respectively correspond to the changing portions of the output signal (e) from the first differentiation circuit 4 (see FIGS. 2C and 2E). Then, detecting the differentiated signal (e) in the detector 5, a detected signal (f) is produced as shown in FIG. 2F. After this, the detected signal (f) is sent to the slicer 6.

Figure 2G:
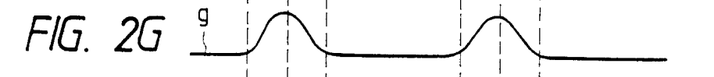

A slice level is predetermined in the slicer 6 whereby an output signal of the slicer 6 is produced only when the detected signal (f) is larger than the predetermined slice level. The purpose of the use of the slicer 6 is to enhance the color difference signal (b) only when the degree of amplitude change of the luminance signal (a) is larger than a predetermined level. This is because the color-ringing is hardly caused when the degree of amplitude change of the luminance signal (a) is small. In this embodiment, such an output signal (g) is presented as shown in FIG. 2G.

Figure 2H:
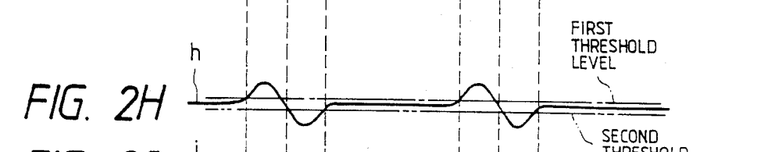
Figure 2I:
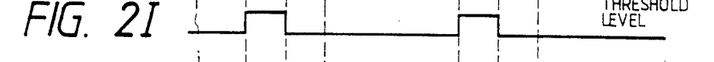
Figure 2J:
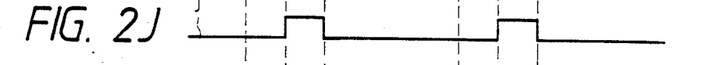

The output signal (g) is differentiated in the second differentiation circuit 7 thereby producing a signal (h) shown in FIG. 2H. Here, the positive portion of the signal (h) indicates a first half time period from the begining of the change to a maximum according to the luminance signal (a), and the negative portion of the signal (h) presents a latter half time period from the maximum to the end of the change. Then the signal (h) is inputted into the comparat,or set 8.

Since the signal (h) includes noise generally, first and second threshold levels are predetermined for using in the respective first and second comparators 8a and 8b. More specifically, when the level of the signal (h) is higher than the first threshold level, a first signal (i) indicative of the first half time period is outputted from the first comparator 8a, and when the level of the signal (h) is lower than the second threshold level, a second signal (j) indicative of the latter half time period is outputted from the second comparator 8b. Thus, the first and second signals are produced in accordance with two predetermined threshold levels. The first signal (i) is sent to the first sample-and-hold circuit 11 and the switching circuit 13, and the second signal (j) is sent to the second sample-and-hold circuit 12 and the switching circuit 13.

Meanwhile, the color difference signal (b) is inputted into a terminal 9, and sent to the second delay circuit 10 and the second sample-and-hold circuit 12. In the second delay circuit 10, the color difference signal (b) is delayed by a delay time which is preferably selected between 200ns and 500ns, as shown in FIG. 2D. Here, the first signal (i) from the first comparator 8a is produced during the above-mentioned first half time period, and the level of the delayed color difference signal (d) starts changing. This delayed signal (d) is also inputted into the first sample-and-hold circuit 11. In the first sample-and-hold circuit 11, the first signal (i) is used as a first hold signal, i.e. the voltage of the delayed signal (d) is sampled at the leading edge of the first hold signal whereby this sampled voltage is continuously outputted when the first hold signal is valid. Therefore, the voltage value at the begining of the change of the delayed signal (d) is held in the first sample-and-hold circuit 11. Then the first sample-and-hold circuit 11 outputs a signal indicative of a first held level of the delayed signal (d).

Similarly, the second signal (j) from the second comparator 8b is produced during the above-mentioned second half time period. At this time, the level change of the color diffarence signal (b) is terminated. Furthermore, the color difference signal (b) is also inputted into the second sample-and-hold circuit 12. In the second sample-and-hold circuit 12, the second signal (j) is used as a second hold signal, i.e. the color difference signal (b) is held therein in response to the second hold signal. Therefore, the voltage value at the end of the change of the color difference signal (d) is held in the second sample-and-hold circuit 12. Then the second sample-and-hold circuit 12 outputs a signal indicative of a second held level of the color difference signal (b).

Figure 2K:
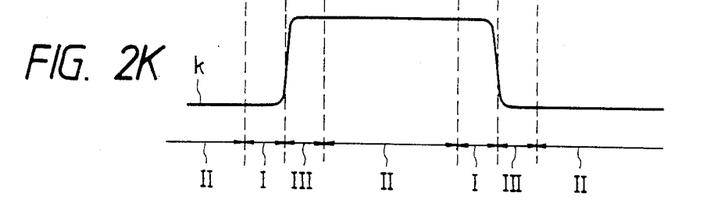

The operation of the switching circuit 13 will be described hereinbelow. The switching circuit 13 is supplied with output signal (I') indicative of the first held level from the first sample-and-hold circuits 11, delayed color difference signal (II'), and output signal (III') indicative of the second held level from the second sample-and-hold circuit 12. One of these three signals (I'), (II'), and (III') is selected in accordance with the combination of the first and second signals (i) and (j) outputted from the comparator set 8. In the switching circuit 13, when the first signal (i) is "H", the signal (I') is selected and outputted to a terminal 14. When the second signal (j) is "H", the signal (III') is selected and outputted to the terminal 14. When both the first and second signals (i) and (j) are "L", the signal (II') is selected and outputted to the terminal 14. As a result, an enhanced color difference signal (k) from the switching circuit 13 is produced as shown in FIG. 2K. In FIG. 2K, reference numerals (I), (II), and (III) respectively denote a time period in which the signal (I) is selected, a time period in which the signal (II) is selected, and a time period in which the signal (III) is selected.

It is to be noted that the delay time of the delay line 3 is predetermined so as to satisfy the condition that inflection points N1 and N2 of the waveform of the band-limited and delayed luminance signal (c) respectively substantially coincide with middles M1 and M2 of the rising and falling portions of the waveform of the color difference signal (d) delayed by the delay line 10.

Figure 3:
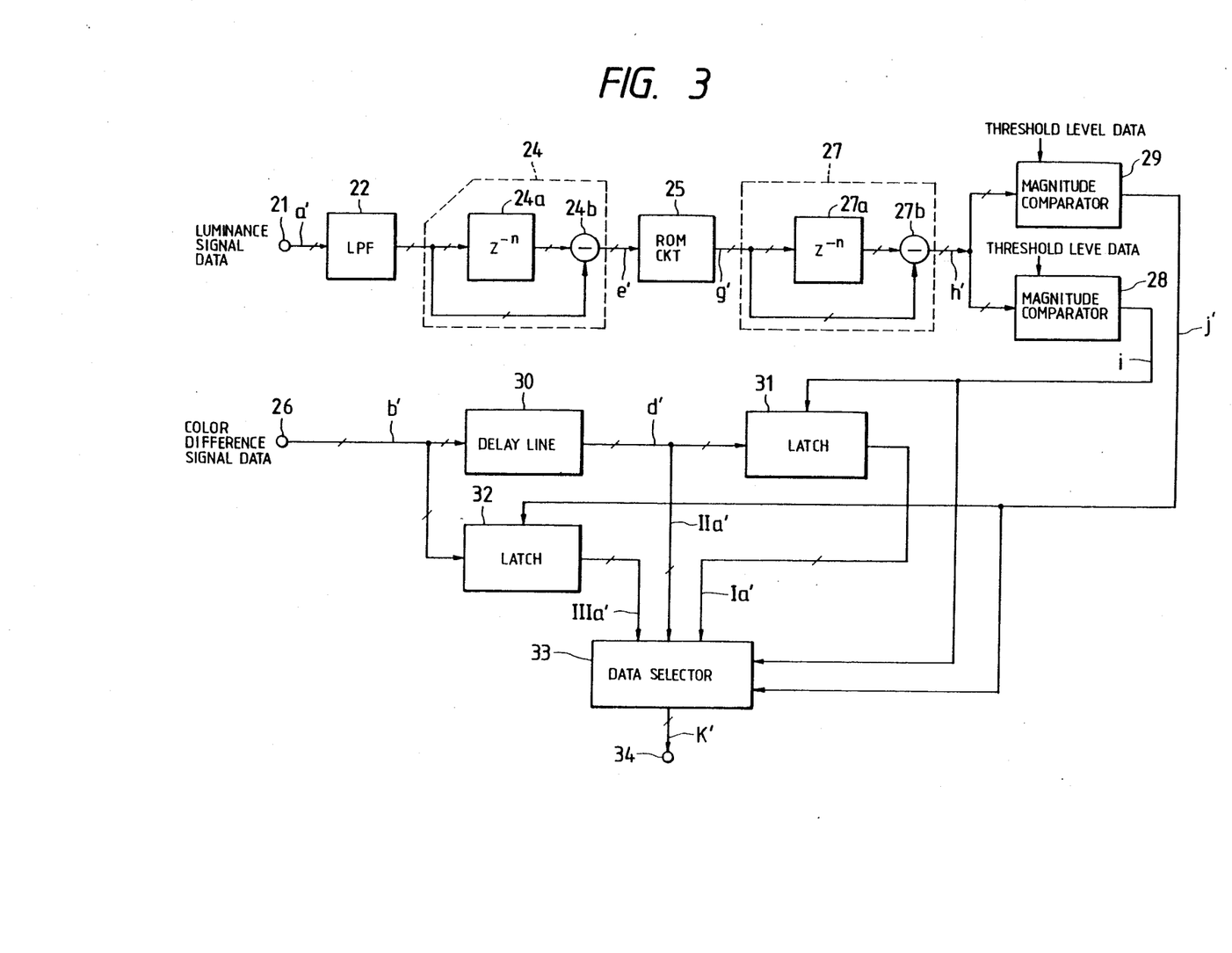
FIG. 3 is a block diagram showing a digital enhancing circuit to which the enhancing circuit of the first embodiment is applied.
Figure 4:
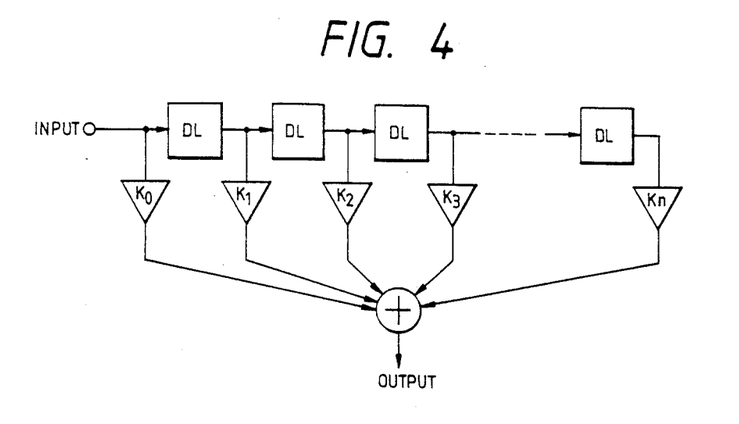
FIG. 4 is a block diagram showing a low-pass filter of each of FIGS. 1 and 3.

FIG. 3 is a block diagram showing a digital enhancing circuit to which the enhancing circuit of the first embodiment is applied. The digital enhancing circuit generally comprises a low-pass filter 22, first and second difference circuits 24 and 27, a ROM circuit 25, first and second magnitude comparators 28 and 29, first and second latch circuits 31 and 32, a delay line 30, and a data selector 33. In this structure, luminance signal data (a') is inputted into a terminal 21, and sent to the low-pass filter 22 to limit the bandwidth of the luminance signal data (a'). An FIR (Finite Impulse Response) filter can be applied to the low-pass filter 22 in this case, and is shown in FIG. 4. In addition, the FIR filter can be also applied to the first embodiment low-pass filter 2. Reference numerals k0-kn represent filter coefficients.

Figure 5:
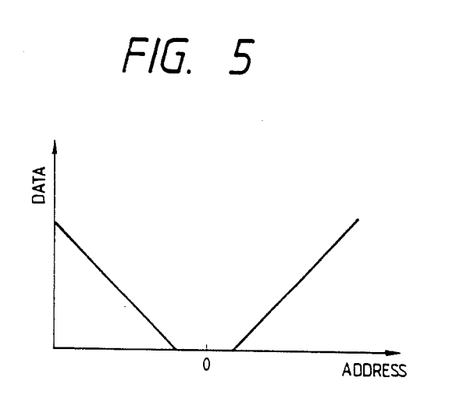
FIG. 5 is a graph showing address-data characteristics which is programmed in a ROM of FIG. 3.

Then the band-limited signal data is inputted into the first difference circuit 24. The first difference circuit 24 includes a latch 24a and a subtractor 24b. In the latch 24a, the band-limited signal data is delayed by n clock pulses, and this delayed signal data is sent to the subtractor 24b. The band-limited signal data is also inputted into the subtractor 24b. In the subtractor 24b, one of the input signal data of the subtractor 24b is subtracted from the other of the input signal data thereof to produce output signal data (e'). This signal data (e') is sent to the ROM circuit 25 as read address. The ROM circuit 25 corresponds to the detector 5 and the slicer 6 of FIG. 1. FIG. 5 is a graph showing address-data characteristics which are programmed in a ROM of the ROM circuit 25. In the ROM circuit 25, this ROM table is looked up whereby signal data (g') is produced in response to the outputted signal data (e').

The second difference ciruict 27 generally comprises a latch 27a and a subtractor 27b. Since the structure and the operation of the second difference circuit 27 are the same as the first difference ciruict 25, the detail description thereof will be omitted here. Output signal data (h') from the second difference ciruict 27 is sent to the magnitude comparators 28 and 29. By compearing the output signal data (h') with predetermined two threshold level data for each of these comparators 28 and 29, signals (i') and (j') are produced. More specifically, since these comparators 28 and 29 operate as the comparator set 8 of FIG. 1, two threshold level are respectively required to produce the signals (i') and (j').

Similar to the enhancing circuit of the first embodiment, the signal (i') is sent to the first latch 31 and the data selector 33, and the signal (j') is applied to the second latch 32 and the data selector 33. The first latch 31 and the second latch 32 respectively operate as the first and second sample-and-hold cirucit 11 and 12 of FIG. 1, and the data selector 33 operates as the switching circuit 13 of FIG. 1. Meanwhile, color difference signal data (b') which is inputted into a terminal 26 is delayed in the delay line 30 thereby producing signal data (d'). The output signal data (d') of the delay line 30 is sent to the latch 31 and the data selector 33, and the data selector 33 is supplied with three signal data (Ia'), (IIa'), and (IIIa'). In the data selector 33, one of these signal data (Ia'), (IIa'), and (IIIa') is selected in accordance with the combination of the signals (i') and (j') outputted from the first and second magnitude comparators 28 and 29. Thus, enhanced color difference signal data (k') is obtained from a terminal 34 by the similar structure and operation to the enhancing circuit of the first embodiment.

Figure 6:
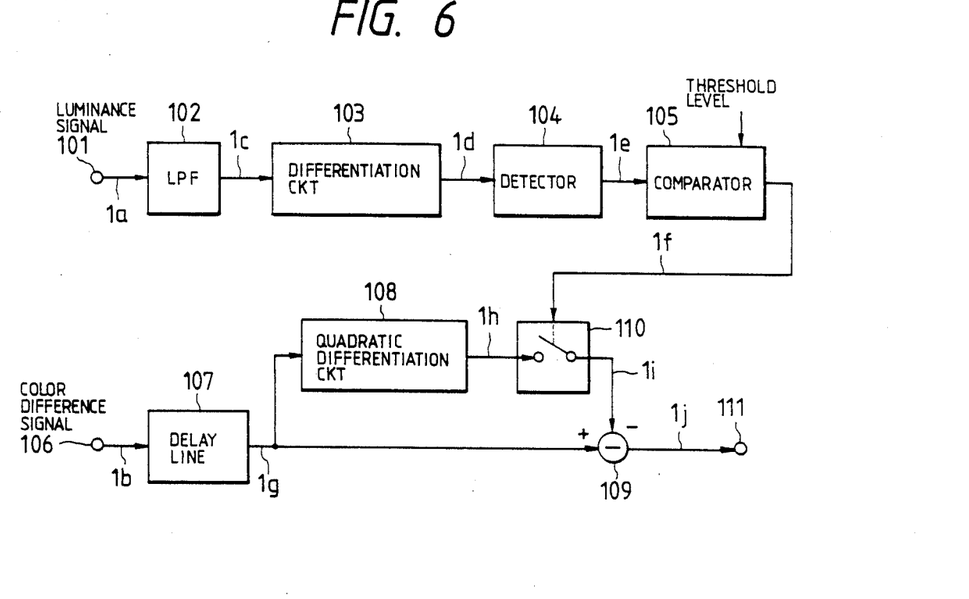
FIG. 6 is a block diagram showing an enhancing circuit of a second embodiment according to the present invention.

FIG. 6 is a block diagram showing an enhancing circuit of a second embodiment according to the present invention. In this embodiment, the enhancing circuit comprises a low-pass filter 102, a differentiation circuit 103, a detector 104, a comparator 105, a delay circuit 107, a quadratic differentiation circuit 108, a switching circuit 110, and a subtractor 109. In this structure, the low-pas filter 102, the differentiation circuit 103, the detector 104, and the delay circuit 107 respectively have the same function as those of the first embodiment of FIG. 1, and the low-pass filter 102 is made of the FIR filter of FIG. 4.

The operation of this enhancing circuit will be described with reference to FIGS. 7A-7J. A luminance signal 1a is inputted into a terminal 101, and the bandwidth thereof is limited in the low-pass filter 102. Such a limited signal 1c is differentiated in the differentiation circuit 103, and this produced differentiated signal 1d is detected in the detector 104. Then, this detected signal 1e is inputted into the comparator 105. In the comparator 105, when the amplitude level of the detected signal 1e is larger than a predetermined threshold level, a signal is outputted to the switching circuit 110. This is because the degree of the color-ringing is negligibly low when the change of colors is small.

Figure 7A:
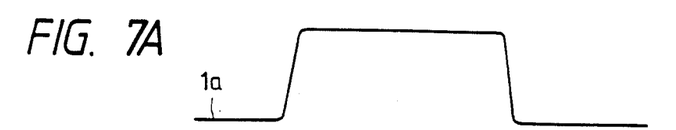
FIGS. 7A-7J show waveforms used for better understanding of the second embodiment.
Figure 7B:
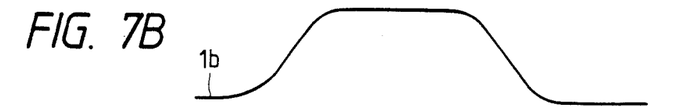
Figure 7C:
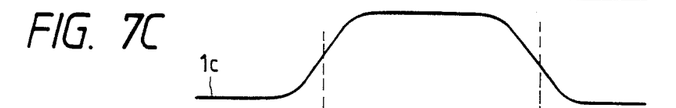
Figure 7D:
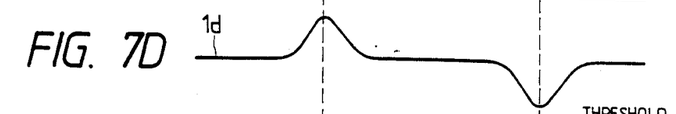
Figure 7E:
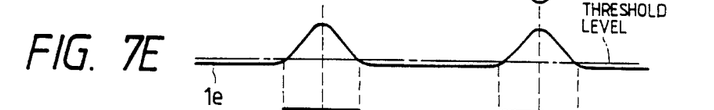
Figure 7F:
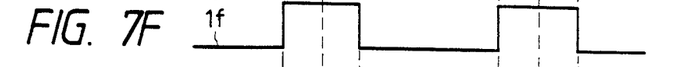
Figure 7G:
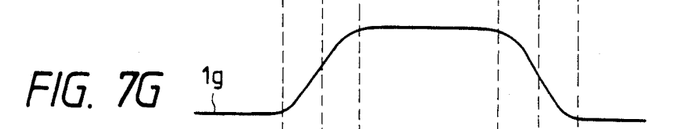
Figure 7H:
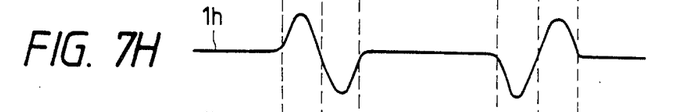
Figure 7I:
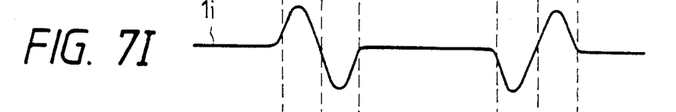
Figure 7J:
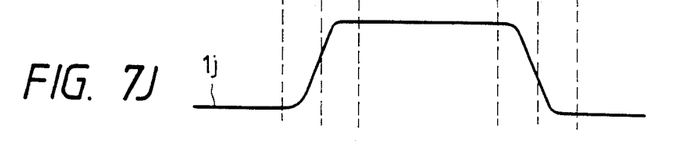

Meanwhile, a color differnce signal 1b is inputted into a terminal 106, and is delayed in the delay circuit 107. An output signal 1g from the delay circuit 107 is sent to the quadratic differentiation circuit 108 and the subtractor 109. If an output signal 1h from the quadratic differentiation circuit 108 is always subtracted from the delayed signal 1g in the subtractor 109, the enhancement of the color difference signal 1b is the same as that of the luminance signal 1a thereby causing the deterioration of SN ratio in flat portions of the waveform of the color difference signal 1b. In order to improve this problem, the second embodiment enhancing circuit has the switching circuit 110 for producing a signal 1i in accordance with the output signal 1f from the comparator 105. In this embodiment, the switching circuit 110 is in "ON" state only when the signal 1f is "H". Thus, the signal 1i is subtracted from the signal 1g during the change of the luminance signal 1a in the subtractor 109 whereby an enhanced signal 1j is outputted to a terminal 111 as shown in FIG. 7J.

Figure 8:
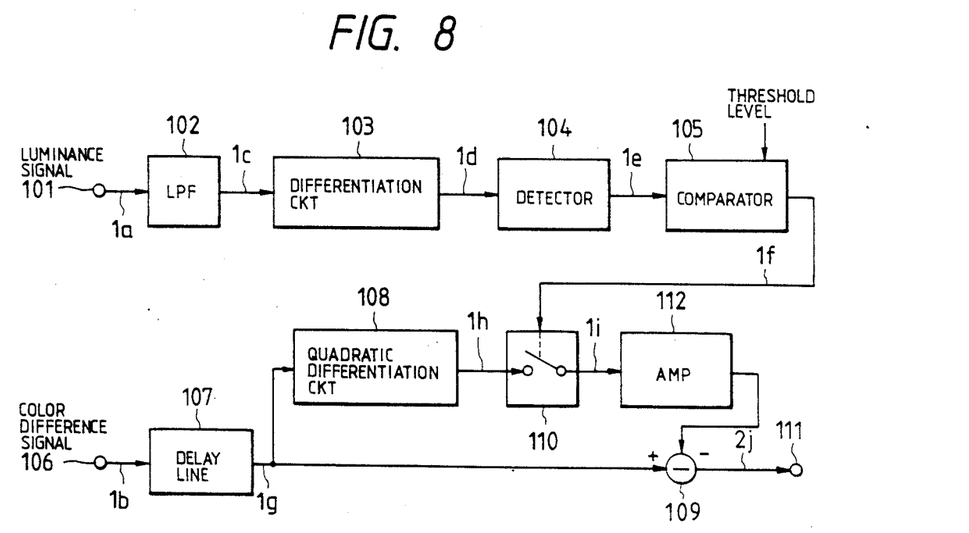
FIG. 8 is a block diagram showing an enhancing circuit of a third embodiment according to the present invention.

In the case that the enhancement of the color difference signal 1b is not enough, the signal 1h may be subtracted from the signal 1g with the signal 1h being amplified. To this end, there is provided another enhancing circuit which is shown in FIG. 8. FIG. 8 is a block diagram showing an enhancing circuit of a third embodiment according to the present invention. Since the structure is the same as that of the enhancing circuit of the second embodiment except that an amplifier 112 is provided between the switching circuit 110 and the subtractor 109, a further discription thereof will be omitted here. According to the third embodiment, the color difference signal 1b can be satisfactorily enhanced whereby an enhanced signal 2j can be obtained from the terminal 111.

Figure 9:
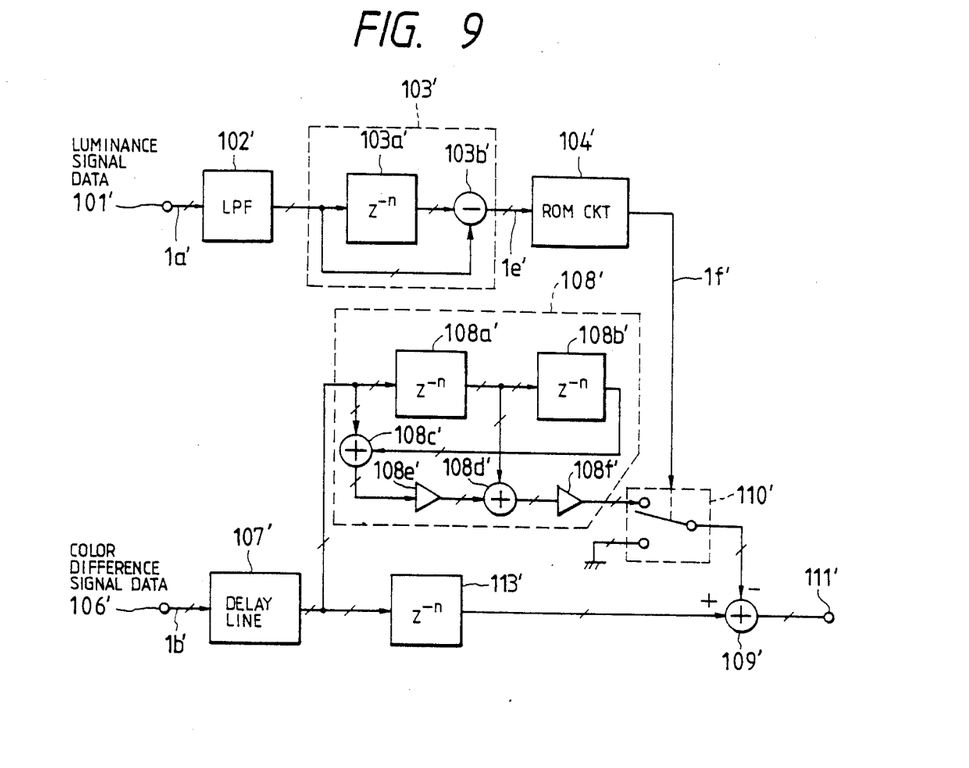
FIG. 9 is a block diagram showing a digital enhancing circuit to which the enhancing circuit of the second embodiment is applied.

FIG. 9 is a block diagram showing a digital enhancing circuit to which the enhancing circuit of the second embodiment is applied. This digital enhancing cirucit comprises a low-pass filter 102', a first difference circuit 103' including a latch 103a and a subtractor 103b, a ROM circuit 104', a delay line 107', a second difference circuit 108', a latch 113', a switching circuit 110', and an adder 109'. The second difference circuit 108' includes two latchs 108a' and 108b', two adders 108c' and 108d', and two multipliers 108e'and 108f'. In this structure, the first and second defference circuits 103' and 108' respectively correspond to the differentiation circuit 103 and the quadratic differentiation circuit 108 of FIG. 6, and the ROM circuit corresponds to the detector 104 and the comparator 105 of FIG. 6. Furthermore, the low-pass filter 102', the delay line 107' the switching circuit 110', and the adder 109' respectively correspond to the low-pass filter 102, the delay circuit 107, the switching cirucit 110, and the subtractor 109.

Figure 10:
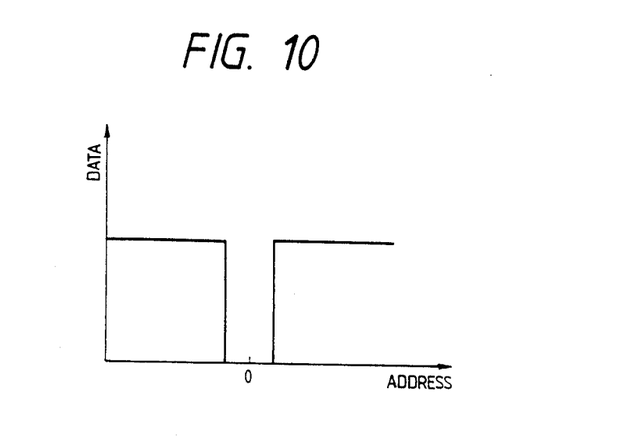
FIG. 10 is a graph showing address-data characteristics which is programmed in a ROM of FIG. 9.

Luminance signal data 1a which is inputted into a terminal 101' is sent to the ROM circuit 104' as read address via the low-pass filter 102' and the first difference circuit 103'. Since the operation of the low-pass filter 104' and the first difference circuit 103' are the same as those of FIG. 3, the discription will be omitted here. FIG. 10 is a graph showing a ROM table, i.e. address-data characteristics which are programmed in a ROM of the ROM circuit 104'. In the ROM circuit 104', the ROM table is looked up, and signal data 1f' is produced in accordance with the outputted signal data 1e' from the subtractor 103'. Meanwhile, color difference signal data 1b' which is inputted into a terminal 106' is sent, via the delay line 107', to the second difference circuit 108' and the latch 113'.

In the second difference circuit 108', the output signal data from the delay line 107' is inputted into the latch 108a' and the adder 108c', and the output signal data from the latch 108a' is sent to another latch 108b' and another adder 108d'. In the adder 108c', the output signal data from the delay line 107' is added to the output signal data from the latch 108b', and then this added signal data is sent to the multiplier 108e'. In the multiplier 108e', this added signal data is multiplied by $-\frac{1}{2}$, and the product signal data is sent to the adder 108d'. In the adder 108d', the output signal data from the latch 108a' is added to the output signal data from the multiplier 108e'. This added signal data is multiplied by a factor in the multiplier 108f' and then sent to the switching circuit 110'. The multiplying factor of the multiplier 108f' is selected in the order of from to unity so that a false color is not produced at a border between mutually different colors. From the second difference circuit 108', data resulted from the quadratic differentiation of the input signal data thereto is produced so that plus/minus sign thereof is reversed. In the switching circuit 110', the output signal from the second difference signal is selected only when the signal 1f' is outputted from the ROM circuit 104', and then outputted to the adder 109'. In the adder 109', the output signal from latch 113' is added to the output signal from the switching circuit 110', and this added signal is outputted to a terminal 111'. It should be noted that such quadratic differentiated data is substantially subtracted from the output signal of the latch 113' because the plus/minus sign is reversed in the second difference circuit 108'. Thus, digital enhanced color difference signal data can be produced.

In the case of the digital enhancing circuit shown in FIG. 9 is used for a reproduced video signal in a home-use video tape recorder in which the reproduced video signal is sampled by sampling frequency of 14.318 MHz (4 fsc), the parameters are preferably selected from the following ranges: n of the latches 108a', 108b' and 113' is between 8 and 16; the cut-off frequency of the low-pass filter 102' is in the order of 1-3MHz; and n of the latch 103a' is between 4 and 8. In addition inserting a coring circuit (not shown) in the path from the adder 108d' and the adder 109', the quality of the reproduced picture can be further improved.

As described hereinabove, the present invention provides a circuit for enhancing a color difference signal by using the change of a luminance signal, and the circuit can be easily applied to a digital enhancing cirucit. In addition, although the FIR filter is applied to the low-pass filters of the present embodiments, it is not limited to the FIR filter. From the figure, it will be apparent that the present enhancing circuit has no deterioration of SN ratio at flat portions of the color difference signal. Therefore, the color-ringing of an image can be satisfactorily reduced.

The above-described embodiments are just examples of the present invention, and therefore, it will be apparent for those skilled in the art that many modifications and variations may be made without departing from the scope of the present invention.

What is claimed is:

1. A digital circuit arrangement for enhancing color difference signal data derived from video signal data, comprising:
   (a) low-pass filter means responsive to luminance signal data of said video signal data for ilmiting the bandwidth of said luminance signal data;
   (b) first difference circuit means responsive to output signal data from said low-pass filter means for differentiating said output signal data from said low-pass filter means;
   (c) ROM circuit means responsive to said output data from said first difference circuit means for looking up a ROM table in said ROM circuit means thereby outputting a signal indicative of a switching signal in response to said output data from said first difference circuit means;
   (d) delay circuit means for delaying said color difference signal data;
   (e) latch means responsive to output signal data from said delay circuit means for latching said output signal data from said delay circuit means;
   (f) second difference circuit means responsive to said output signal data from said delay circuit means for differentiating said output signal data from said delay circuit means two times thereby outputting first signal data indicative of difference signal data; and
   (g) switching circuit means for outputting said difference signal data from said second difference circuit means in response to said switching signal outputted from said ROM circuit means; and
   (h) adder means for substantially subtracting output signal data of said switching circuit means from output signal data of said latch means thereby outputting signal data indicative of enhanced color difference signal data.

2. A digital circuit arrangement as claimed in claim 1 wherein said second difference circuit means includes first and second latches, and first and second adders, said first latch being responsive to said output signal data from said delay circuit means, said second latch being responsive to output signal data from said first latch, said first adder being responsive to said output signal data from said delay circuit means and output signal data from said second latch, said second adder being responsive to said output signal data from said first latch and output signal data from said first adder thereby outputting said first signal data.

* * * * *